United States Patent
Riner et al.

(12)

(10) Patent No.: US 11,646,536 B1
(45) Date of Patent: May 9, 2023

(54) STACKING OUTLET ENCLOSURES

(71) Applicant: Group Dekko, Inc., Fort Wayne, IN (US)

(72) Inventors: Raymond H. Riner, Fort Wayne, IN (US); Brian K. Rupert, Kendallville, IN (US)

(73) Assignee: Group Dekko, Inc., Fort Wayne, IN (US)

( * ) Notice: Subject to any disclaimer, the term of this patent is extended or adjusted under 35 U.S.C. 154(b) by 34 days.

(21) Appl. No.: 17/518,924

(22) Filed: Nov. 4, 2021

(51) Int. Cl.
*H01R 13/73* (2006.01)
*H01R 25/00* (2006.01)
*A47B 21/06* (2006.01)

(52) U.S. Cl.
CPC .......... *H01R 25/006* (2013.01); *A47B 21/06* (2013.01); *H01R 13/73* (2013.01); *A47B 2021/066* (2013.01)

(58) Field of Classification Search
CPC ...... H01R 25/006; H01R 13/73; H01R 27/02; H01R 31/06; A47B 21/06
See application file for complete search history.

(56) References Cited

U.S. PATENT DOCUMENTS

| | | | | |
|---|---|---|---|---|
| 3,889,044 | A * | 6/1975 | Flachbarth | H02G 3/0493 220/3.94 |
| 6,220,880 | B1 * | 4/2001 | Lee | H01R 25/003 439/535 |
| 6,805,581 | B2 * | 10/2004 | Love | H01R 13/447 439/367 |
| 7,004,786 | B1 * | 2/2006 | Bloom | H01R 13/72 439/142 |
| 9,124,056 | B1 * | 9/2015 | Lewis, Jr. | H02G 3/185 |

* cited by examiner

*Primary Examiner* — Tho D Ta
(74) *Attorney, Agent, or Firm* — Taylor IP, P.C.

(57) ABSTRACT

A stacking power outlet enclosure system for installation in a tower pedestal table, the tower pedestal table having a column extending up from a base. The stacking power outlet enclosure system including at least one enclosure and an electrical power outlet board within the enclosure. The electrical power outlet board having electrical power receptacles positioned on opposite sides of the board. The receptacles being accessible on opposite sides of the enclosure, the enclosure being insertable into the column, and the power receptacles being available through the column.

18 Claims, 6 Drawing Sheets

STACKING OUTLET ENCLOSURES

BACKGROUND OF THE INVENTION

1. Field of the Invention

The present invention relates to enclosures for electrical outlet boards having multiple outlets on opposites sides of the enclosures.

2. Description of the Related Art

An electrical receptacle is arranged to receive an electrical plug, which is a movable connector attached to an electrically operated device. The receptacle is typically fixed on equipment or affixed to some building structure and is connected to an energized electrical circuit. The electrical receptacle sometimes also referred to as a socket may be surrounded by a decorative or protective cover, which may be integral with the receptacle.

Single-phase electrical receptacles have two current-carrying connections to the power supply circuit and may also have a third pin for a safety connection to earth ground. Electrical receptacles are often provided in pairs with such an arrangement being referred to as a duplex electrical outlet.

Electrical power strips are often used to power office equipment on or around office furniture. Such power strips generally have more than two electrical receptacles along a surface of the power strip. Plugs of equipment are then plugged into the power strip.

Tables and trays exist in the earliest records of mankind. Elevated flat surfaces that provide a natural utility to the user are needed for a variety of purposes and as such have developed into numerously varied items. For example, desks, nightstands, chests of drawers, counter tops, end tables, TV trays, to name a few, all have flat upper surfaces.

In public areas, such as parks, a pedestal table can be provided having a single column support that is embedded in the ground, or in a suitable ballast to prevent movement, with a tabletop mounted to the top of the single column. A movable version is often used in reception areas in the form of small tabletops arranged at a height that allow easy use for the setting of drinks or food thereon, while people stand therearound, allowing people to congregate around for collaboration and socialization.

In cases where outlets are placed into a housing, particularly a housing that is curved or non-flat, such as a pedestal for a table, there is a need to retain and position the outlets so that they can be properly presented through the non-flat surface.

What is needed in the art is a cost-effective enclosure system that allows for the delivery of electrical power from electrical outlets contained in non-flat housings such as tubular columns.

SUMMARY OF THE INVENTION

The present invention provides an enclosure for a back-to-back electrical power outlet board the enclosure being insertable into a tubular column.

The invention in one form is directed to a stacking power outlet enclosure system for installation in a tower pedestal table, the tower pedestal table having a column extending up from a base. The stacking power outlet enclosure system including at least one enclosure and an electrical power outlet board within the enclosure. The electrical power outlet board having electrical power receptacles positioned on opposite sides of the board. The receptacles being accessible on opposite sides of the enclosure, the enclosure being insertable into the column, and the power receptacles being available through the column.

The invention in another form is directed to a stacking power outlet enclosure system insertable into a column. The system including at least one enclosure and an electrical power outlet board within the enclosure. The electrical power outlet board having electrical power receptacles positioned on opposite sides of the board. The receptacles being accessible on opposite sides of the enclosure, the enclosure being insertable into the column, and the power receptacles being available through the column.

An advantage of the present invention is that it presents electrical outlets that are on both sides of a printed circuit board through both sides of the enclosure.

Another advantage of the present invention is that the enclosure can be fitted into a tight constrained place, such as inside a tubular column.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figures 1, 2:
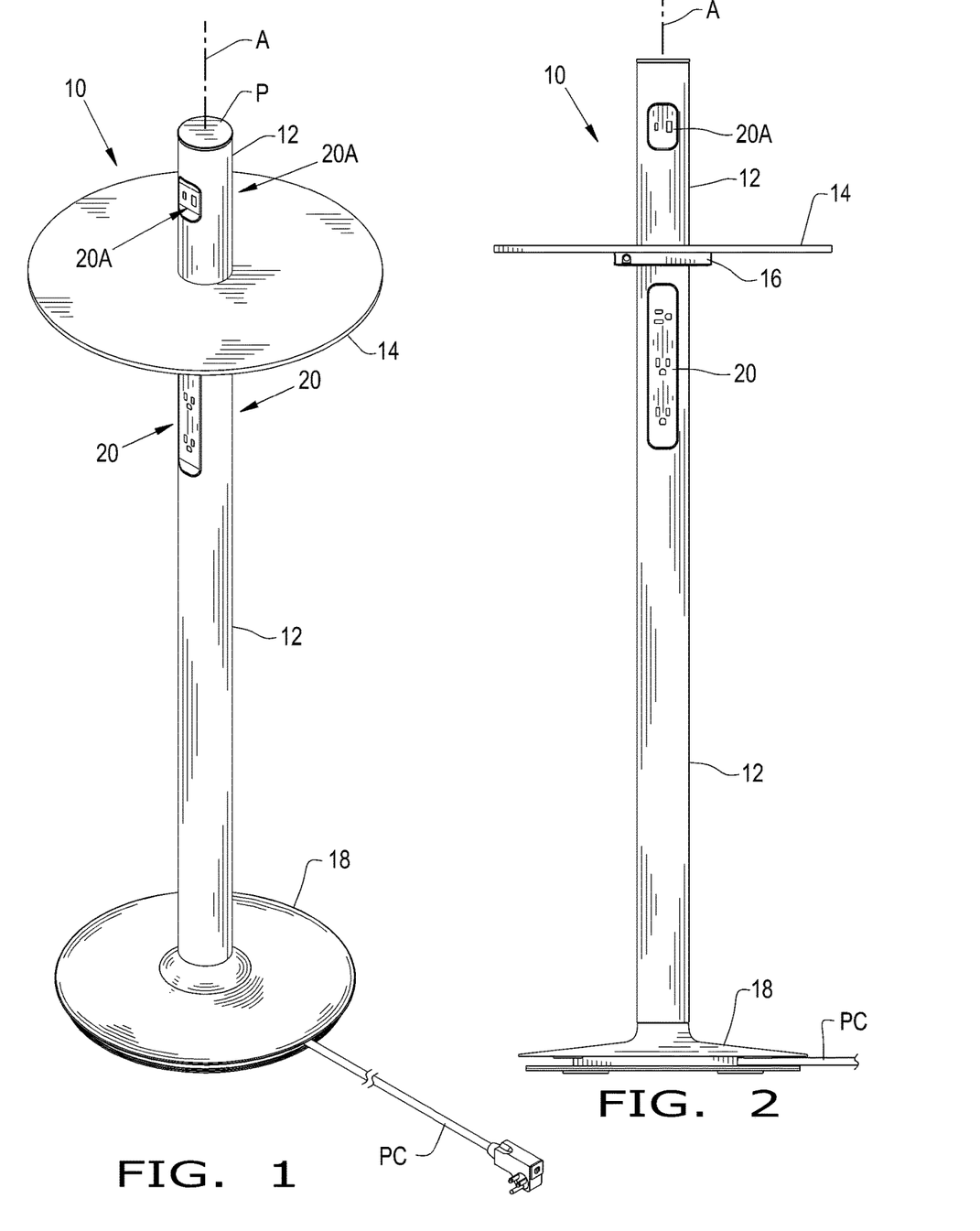
FIG. 1 is a perspective view of an embodiment of a tower tray system having an embodiment of a stacking power outlet enclosure system of the present invention therein.
FIG. 2 is a side view of the tower tray system of FIG. 1.

Referring now to the drawings, and more particularly to FIGS. 1 and 2, there is shown an embodiment of a tower system 10 including a column 12, a tray 14, a tray collar 16, a base 18, a set of outlets 20, and a set of outlets 20A. Tray collar 16 can also be referred to as a tray clamp 16. Tray column 12 may be a cylindrical tube 12 having electrical and data connections presented along the sides that are connected to electrical conductors that run therein. Tray 14 is illustrated as a disk-shaped tray 14, although other shapes are also contemplated. Tray 14 has an opening 24 though which column 12 extends. Tower system 10 is generally symmetrical along axis A in that outlets 20 and 20A are present on each side of column 12, although the positioning of the individual receptacles are offset in the longitudinal direction along axis A, so that the compact placement of the receptacles is possible in column 12.

Base 18 is arranged to set on a horizontal surface and provides support to column 12. Base 18 is formed to allow an electrical power cord PC to extend therefrom and have an opening through which electrical wiring can extend into column 12. Column 12 is depicted as a cylindrical tube 12, although other shapes are contemplated. Column 12 provides a wiring chase through which internal wiring is provided for the powering of outlets 20 and charging circuits that may be made available at outlets 20A. Slots are cut or formed along sides of column 12 to allow power fixtures such as outlets 20 and 20A that are presented to, and are available for, use by the user of tower tray system 10. Outlets 20 and 20A are presented on both sides of column 12, even though only one side is illustrated.

Outlets 20 and 20A have faceplates (additionally see FIG. 7) that conform with edges in the slots in column 12, so that edges of that slot are covered. The ends of the cover plates extend along the curve created by the curved ends of the slot, as seen in in FIG. 1, and the curve of the surface of column 12. The placing of outlets 20 and 20A along surfaces of column 12 are a mater of choice and can be at various positions along the length of column 12. A top plate P can be inserted at the top of column 12 to provide a finished look, and top plate P can be removed to provide access to the interior of column 12.

Tray collar 16 is constrained against column 12, with collar 16 being under tension, hence compressing collar 16 against column 12 to thereby prevent the movement of collar 16 relative to column 12. This allows tray 14 to rest upon tray collar 16.

Figure 3:
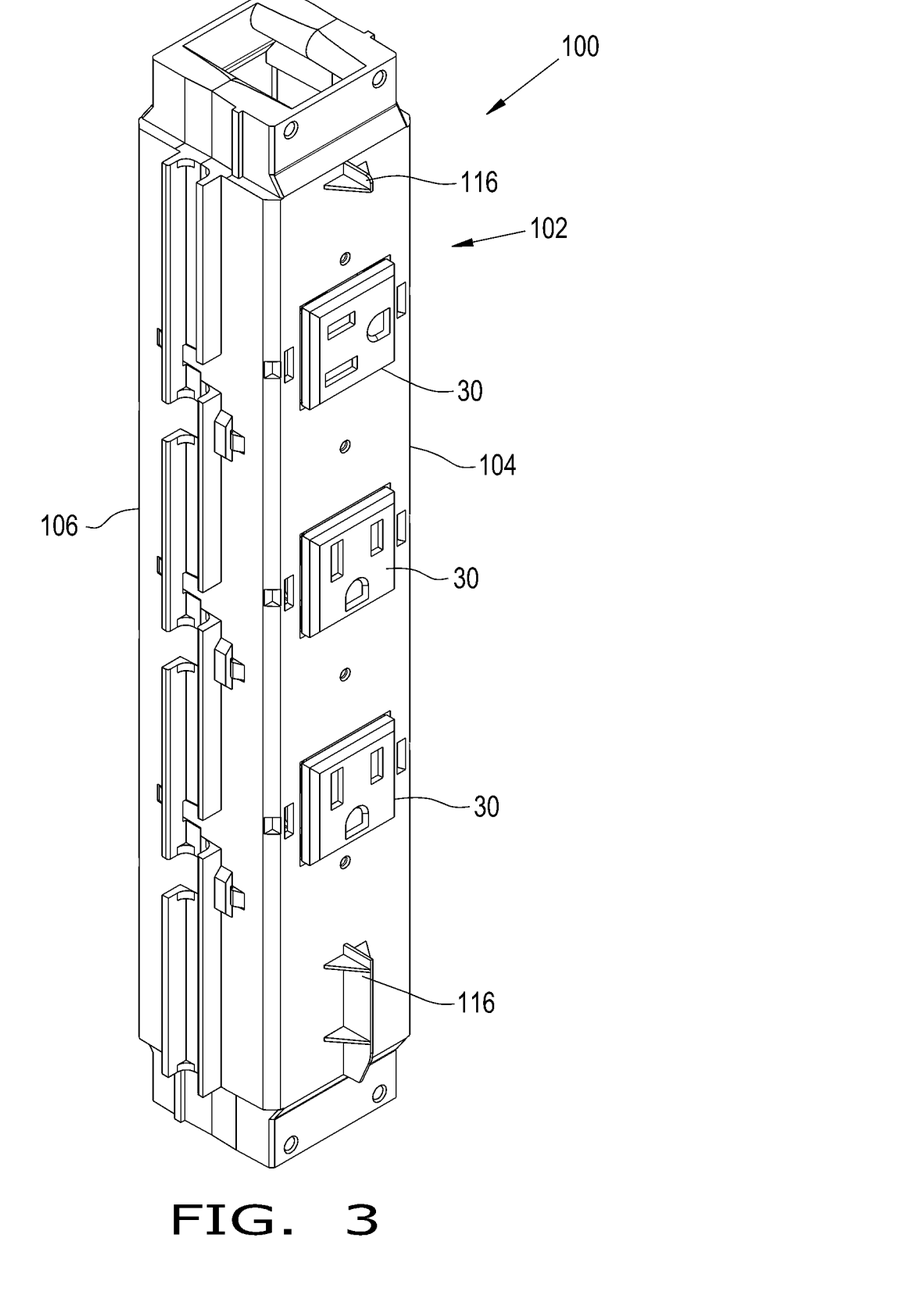
FIG. 3 is a perspective view of an embodiment of a stacking power outlet enclosure system of the present invention, with a back-to-back electrical outlet board therein that is inserted into the tower tray system of FIGS. 1 and 2.
Figure 4:
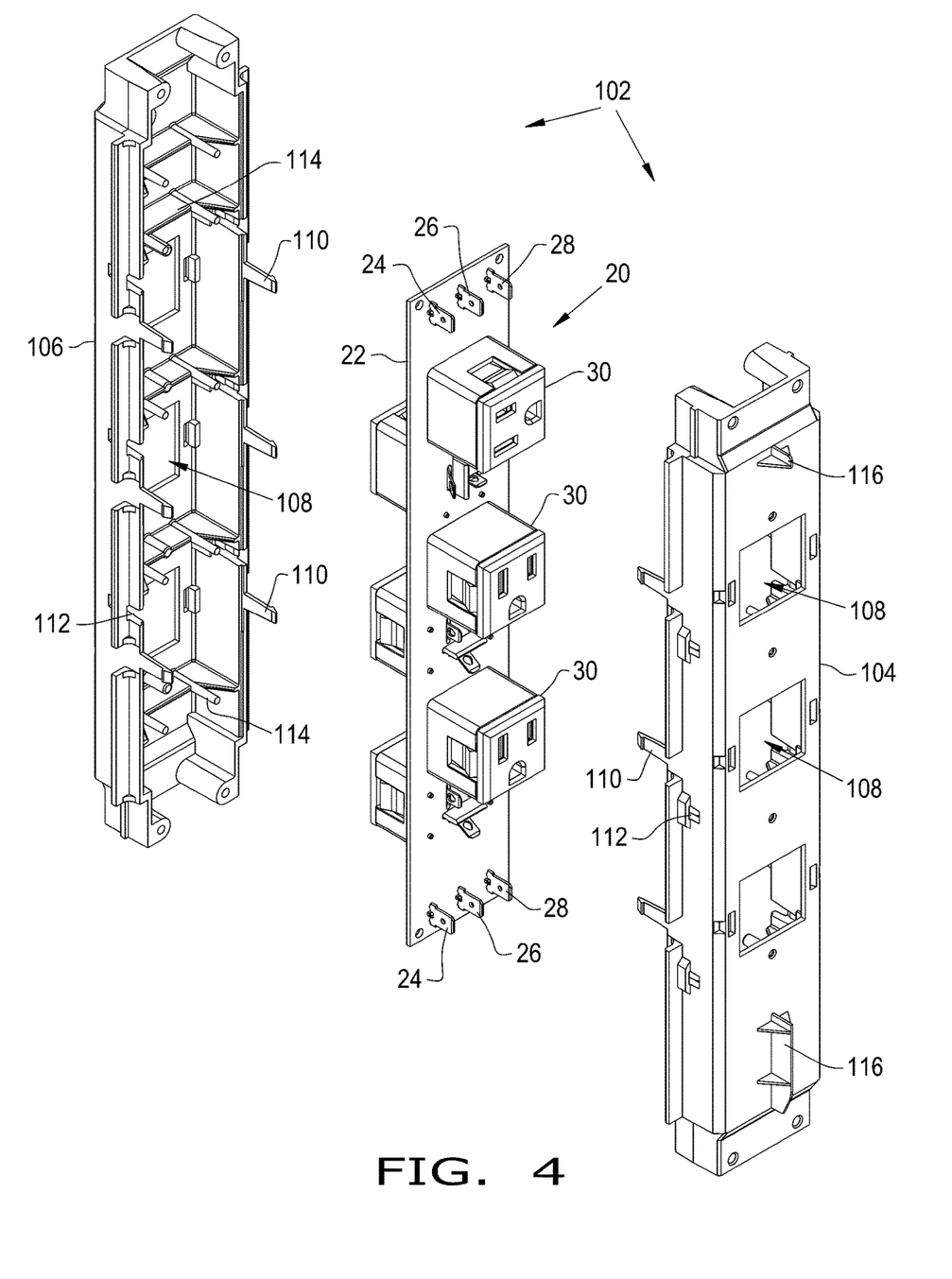
FIG. 4 is an exploded perspective view of the stacking power outlet enclosure system of FIG. 3, also illustrating the back-to-back electrical outlet board located therein.

Now, additionally referring to FIGS. 3 and 4, there is shown a part of a stacking power outlet enclosure system 100, including an enclosure 102 through which receptacles 30, which are part of outlet 20 can be seen extending. Enclosure 102 has portions 104 and 106, which may be identical, or at least complementary to each other. Enclosure portions 104 and 106 each have openings 108 that allow receptacles 30 to partially extend through, so that the staggered positioning of receptacles 30 is accommodated when enclosure portions 104 and 106 are mated together. It is contemplated that enclosure portions 104 and 106 may be hinged together along one side and then snapped together around outlets 20.

As illustrated enclosure portions 104 and 106, have protrusions 110 that interact with receiving slots 112 so that enclosure portions 104 and 106 can be joined together to form enclosure 102. The interaction of protrusions 110 and slots 112 provide a locking connection that are connected by hand without the need for any tools. Inside of enclosure portions 104 and 106 are several cradling protrusions 114 that provide for the centering of outlets 20 and a printed circuit board 22, which is a part of outlets 20. Cradling protrusions 114 serve to center receptacles 30 in openings 108 so that receptacles 30 extend through openings 108 a desired amount.

Outlets 20 includes have receptacles 30 soldered to both sides of printed circuit board 22 in a staggered arrangement. Printed circuit board 22 also has terminals 24, 26 and 28 arranged on each end so that electrical power connections can be made to supply power to outlets 20 and electrical connections can be made to outlets 20A. Receptacles 30 are arranged so that half are mounted on one side of printed circuit board 22 and the other half are mounted on the other side of printed circuit board 22.

Printed circuit board 22 has electrical power conduction paths thereon that connect the electrical power, electrical neutral and electrical ground to each of receptacles 30 and to terminals 24, 26 and 28. Terminals 24, 26 and 28 allow for slide on wiring terminations on each end of printed circuit board 22, which allows the conductors of power cord PC to be connected to one end of printed circuit board 22 and terminals 24, 26 and 28 on the other end of printed circuit board 22 allow for the connection of conductors to convey electrical power to outlet board 20A.

Printed circuit board 22 is a laminated sandwich structure of insulating layers with conductive pathways or traces therebetween. The conductive traces carryout the electrical conductance that is needed for the receptacles 30 and terminals 24, 26 and 28 to be electrically connected and to function. Advantageously, power outlet board 20 provides a compact assembly for the number of receptacles in the orientation they are in on a compact board.

Enclosure 102 additionally has protrusions 116 on exterior surfaces to provide for centering of enclosure 102 within column 12 relative to axis A. The overall shape of enclosure 102 is arranged to accommodate the interion of column 12.

Figure 5:
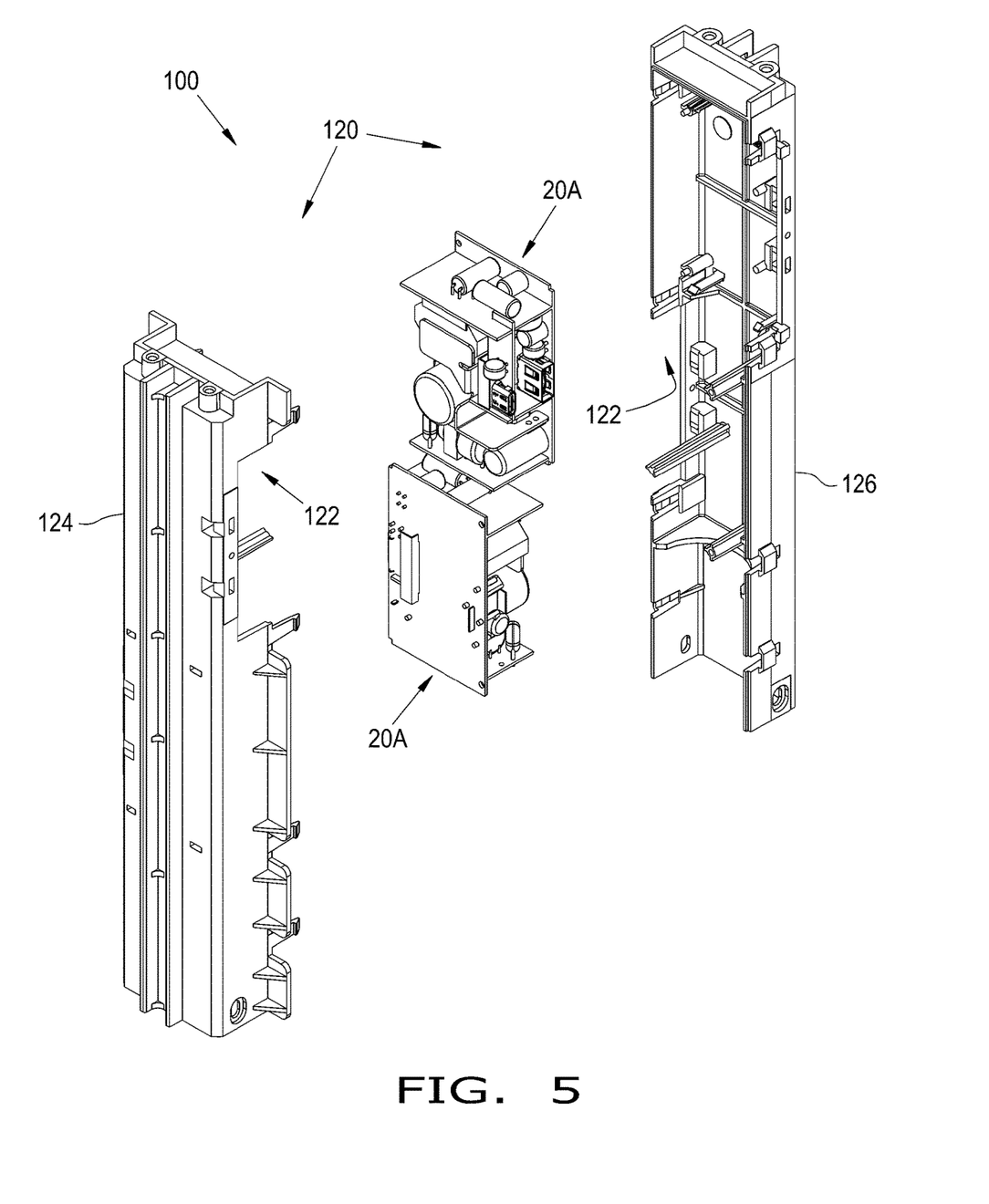
FIG. 5 is an exploded perspective view of another embodiment of a stacking power outlet enclosure system of the present invention that is couplable to the stacking power outlet enclosure system of FIGS. 3 and 4.

Now, additionally referring to FIG. 5, there is shown an enclosure 120, which is another embodiment of the enclosures of the present invention having some of the characteristics of enclosure 102. Enclosure 120 is arranged to hold outlets 20A, shown here as a power supply system 20A to distribute power for mobile electronic devices, such as computers and phones. Here enclosure 120 is shown with openings 122 along a side of enclosure 120 through which a portion of power supply system 20A can extend, for example a USB connector. Enclosure 120 has enclosure portions 124 and 126 that are arranged to snap together and positions power supply systems 20A therein, with electrical power being supplied thereto by way of wiring not illustrated for the purpose of clarity.

Figure 6:
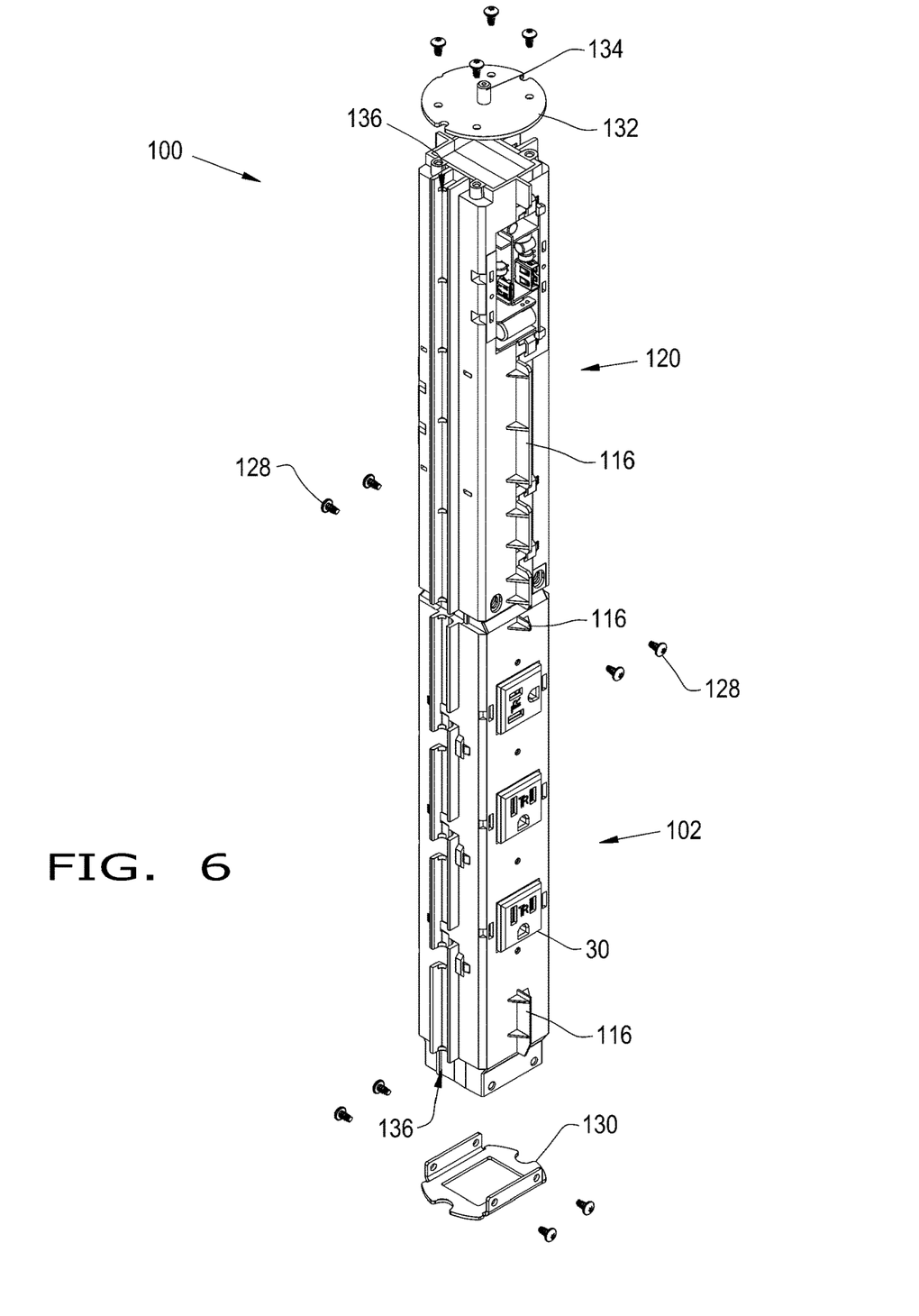
FIG. 6 is an exploded perspective view of the stacking power outlet enclosure system of FIGS. 3-5, illustrating the coupling of the two embodiments.

Now, additionally referring to FIG. 6, there is shown stacking power outlet enclosure system 100 with enclosures 102 and 120 coupled together end-to-end with screws 128 being used to secure them together. A lower plate 130 is shown being connected to a bottom portion of enclosure 102. Lower plate 130 has an opening therethrough, which allows for electrical power to be supplied to printed circuit board 22 contained in enclosure 102. The actual wiring is not shown so that the elements of the present invention can be more easily seen. A coupling member 132 is shown being connected to a top part of enclosure 120. Coupling member 132 has a fastener element 134 located in a center portion thereof. Fastener element 134 may be in the form of a threaded element 134, so that stacking power outlet enclosure system 100 can then be connected in column 12 from coupling member 132 to a top plate P (see FIG. 7).

Figure 7:
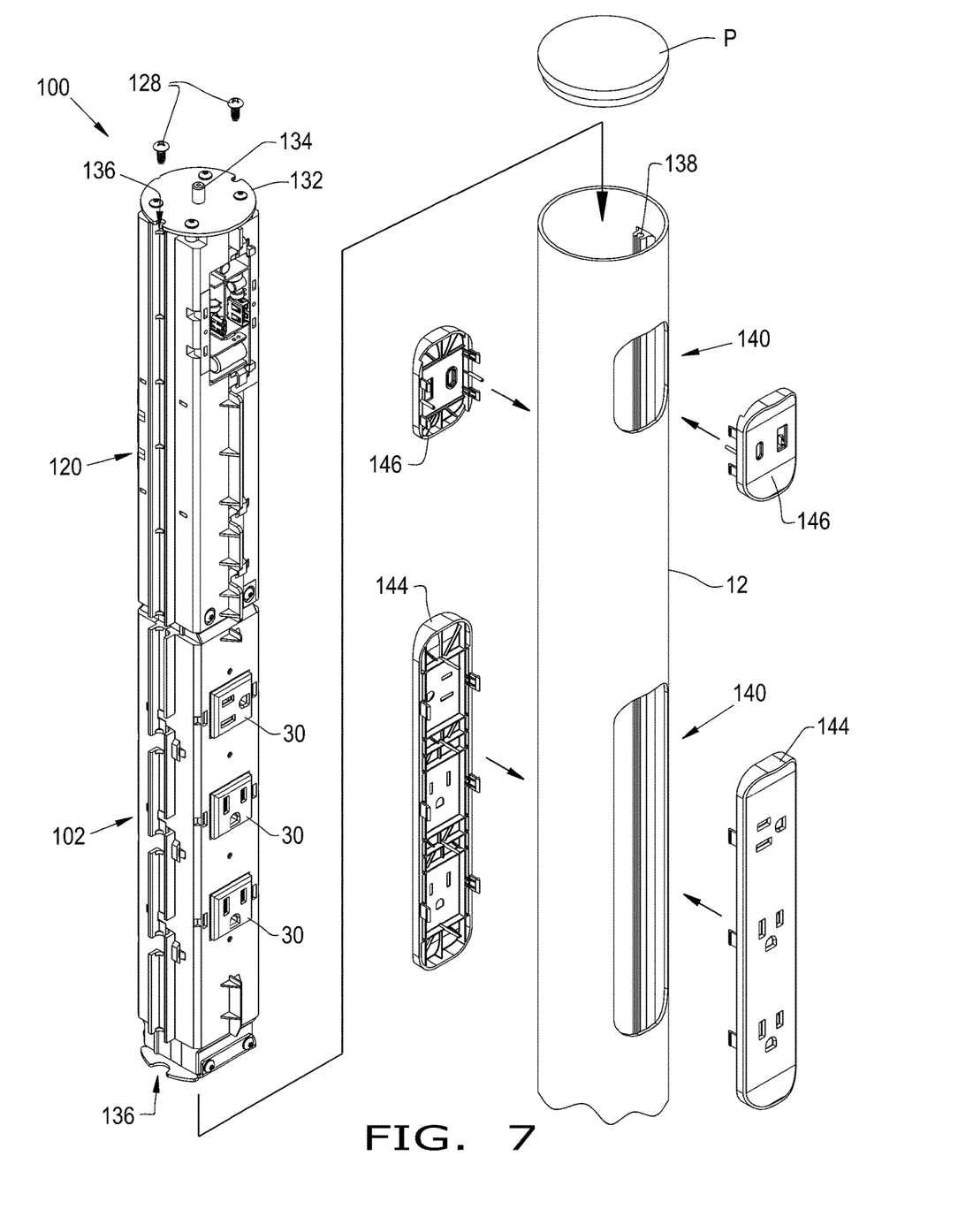
FIG. 7 is an exploded perspective view of the stacking power outlet enclosure system of FIGS. 3-6, being installed in the tower system of FIGS. 1 and 2.

Now, additionally referring to FIG. 7, it is illustrated how stacking power outlet enclosure system 100 is located inside of column 12 and is secured thereto. Stacking power outlet enclosure system 100, in its assembled state illustrates that a channel 136 exists along each side of enclosures 102 and 120, which can interact with corresponding protrusions 138 inside of column 12 with screws 128 being used to connect coupling member 132 to protrusions 138, once stacking power outlet enclosure system 100 is inserted into column 12. The insertion of stacking power outlet enclosure system 100 aligns outlets 20 and 20A with column openings 140, along the sides of column 12. Then top plate P is threaded to fastener element 134 to enclose the top of column 12.

Faceplates 144 and 146 are then snapped into place into receiving slots of enclosures 102 and 120, respectively, to finish the look of column 12 and tower system 10.

It is also contemplated that stacking power outlet enclosure system 100 may be suspended from the top of column 12 by way of top plate P, with faceplates 144 and 146 being used to secure enclosures 102 and 120 with openings 140 in column 12.

Electrical wiring that supplies power to electrical outlets 20 and charging outlets 20A are contained within column 12. Power cord PC exits from base 18 and is electrically connected to outlets 20 and outlets 20A within column 12. It is also contemplated that electrical power could alternatively be supplied through an opening in the top of column 12. Although tower tray system 10 has been illustrated as being configured to set on a horizontal surface, it is also contemplated that another embodiment of tower tray system 10 would extend from a floor to a ceiling. Further it is also contemplated that a tower tray system 10 could be suspended from a ceiling or another horizontal structure in a room. Enclosure system 100 can be utilized in a tubular column 12 without any reference to tray system 10.

Stacking power outlet enclosure system 100 is illustrated herein for installation in a tower pedestal table 10. Stacking power outlet enclosure system 100 includes at least one enclosure 102, 120, with electrical power outlet board 20 within the enclosure 102. Electrical power outlet board 20 has electrical power receptacles 30 positioned on opposite sides of board 22. Receptacles 30 are accessible on opposite sides of enclosure 102. Enclosure 102 is insertable into column 12, with power receptacles 30 being available through opposite sides of column 12.

Electrical power receptacles 30 are staggered from each other on the opposite sides of electrical power outlet board 20. Enclosure 102 has corresponding openings 108 through which electrical power receptacles 30 at least partially extend.

Coupling member 132 is connectable to an end of enclosure 102, and they are together insertable into column 12. Top plate P is connected to coupling member 132, with top plate P resting on the end of column 12.

Enclosure 102 and enclosure 120 are coupled end-to-end, with enclosure 102 having electrical power outlet board 20 therein. Enclosure 120 has at least one power supply member 20A therein. Enclosures 102, 120 are inserted into an end of column 12. Coupling member 132 is connected to an end of enclosure 120.

Faceplates 144 are applied to a side of enclosure 102 through opening 140 in a side of column 12. A second faceplate 144 is then applied to an opposite side of enclosure 102 through a second opening 140 in column 12. Faceplate 146 is applied to enclosure 120 through a third opening 140 in column 12.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A stacking power outlet enclosure system for installation in a tower pedestal table, the tower pedestal table having a column extending up from a base, the stacking power outlet enclosure system comprising:
   at least one enclosure; and
   an electrical power outlet board within the enclosure, the electrical power outlet board having electrical power receptacles positioned on opposite sides of the board, the receptacles being accessible on opposite sides of the enclosure, the enclosure being insertable into an end of the column, the power receptacles being available through opposite sides of the column.

2. The stacking power outlet enclosure system of claim 1, wherein the electrical power receptacles are staggered from each other on the opposite sides of the electrical power outlet board, the enclosure having corresponding openings through which the electrical power receptacles at least partially extend.

3. The stacking power outlet enclosure system of claim 1, wherein the tower pedestal table has a tray having an opening through which the column extends.

4. The stacking power outlet enclosure system of claim 1, further comprising a coupling member connected to an end of the enclosure.

5. The stacking power outlet enclosure system of claim 4, wherein the coupling member also is insertable into the column, the tower pedestal table including a top plate that is connected to the coupling member, the top plate resting on the end of the column.

6. The stacking power outlet enclosure system of claim 5, further comprising a plurality of faceplates including a first faceplate and a second face plate, the first faceplate being applied to a side of the enclosure through an opening in a side of the column, and the second faceplate being applied to an opposite side of the enclosure through another opening in the column.

7. The stacking power outlet enclosure system of claim 1, wherein the at least one enclosure is a plurality of enclosures including a first enclosure and a second enclosure, the first enclosure having the electrical power outlet board therein, the second enclosure having at least one power supply member therein, the first enclosure being connected to the second enclosure.

8. The stacking power outlet enclosure system of claim 7, wherein the first and second enclosures are inserted into an end of the column.

9. The stacking power outlet enclosure system of claim 8, further comprising a coupling member connected to an end of the second enclosure.

10. The stacking power outlet enclosure system of claim 9, wherein the coupling member also is insertable into the column, the tower pedestal table including a top plate that is connected to the coupling member, the top plate resting on the end of the column, the coupling member securing the stacking power outlet enclosure system within the column.

11. The stacking power outlet enclosure system of claim 10, further comprising a plurality of faceplates including a first faceplate, a second faceplate and a third faceplate, the first faceplate being applied to a side of the first enclosure through a first opening in a side of the column, the second faceplate being applied to an opposite side of the first enclosure through a second opening in the column, the third faceplate being applied to the second enclosure through a third opening in the column.

12. A stacking power outlet enclosure system insertable into a column, the system comprising:

at least one enclosure; and an electrical power outlet board within the enclosure, the electrical power outlet board having electrical power receptacles positioned on opposite sides of the board, the receptacles being accessible on opposite sides of the enclosure, the enclosure being inserted into an end of the column, the power receptacles being available through the column.

13. The stacking power outlet enclosure system of claim 12, wherein the electrical power receptacles are staggered from each other on the opposite sides of the electrical power outlet board, the enclosure having corresponding openings through which the electrical power receptacles at least partially extend.

14. The stacking power outlet enclosure system of claim 12, further comprising a coupling member connected to an end of the enclosure.

15. The stacking power outlet enclosure system of claim 14, wherein the coupling member also is insertable into the column, the column including a top plate that is connected to the coupling member, the top plate resting on the end of the column suspending the enclosure from the top plate.

16. The stacking power outlet enclosure system of claim 15, further comprising a plurality of faceplates including a first faceplate and a second faceplate, the first faceplate being applied to a side of the enclosure through an opening in a side of the column, and the second faceplate being applied to an opposite side of the enclosure through another opening in the column.

17. The stacking power outlet enclosure system of claim 12, wherein the at least one enclosure is a plurality of enclosures including a first enclosure and a second enclosure, the first enclosure having the electrical power outlet board therein, the second enclosure having at least one power supply member therein, the first enclosure being connected to the second enclosure.

18. The stacking power outlet enclosure system of claim 17, further comprising a coupling member connected to an end of the second enclosure, the first and second enclosures being inserted into an end of the column, the column including a top plate that is connected to the coupling member, the top plate resting on the end of the column.

\* \* \* \* \*